United States Patent
Eddy et al.

(10) Patent No.: US 10,670,322 B2
(45) Date of Patent: Jun. 2, 2020

(54) SERIES LOOP INTERMODAL CONTAINER

(71) Applicant: Carrier Corporation, Palm Beach Gardens, FL (US)

(72) Inventors: Renee A. Eddy, Manlius, NY (US); Jeffrey J. Burchill, Baldwinsville, NY (US); Giorgio Rusignuolo, Manlius, NY (US); Robert A. Chopko, Baldwinsville, NY (US); Larry D. Burns, Avon, IN (US); Ivan Rydkin, Rochester, NY (US); Ciara N. Poolman, Syracuse, NY (US); Paul Papas, West Hartford, CT (US); Parmesh Verma, South Windsor, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 77 days.

(21) Appl. No.: 15/774,740

(22) PCT Filed: Nov. 9, 2016

(86) PCT No.: PCT/US2016/061059
§ 371 (c)(1),
(2) Date: May 9, 2018

(87) PCT Pub. No.: WO2017/083334
PCT Pub. Date: May 18, 2017

(65) Prior Publication Data
US 2018/0328643 A1     Nov. 15, 2018

Related U.S. Application Data

(60) Provisional application No. 62/253,081, filed on Nov. 9, 2015.

(51) Int. Cl.
*F25D 11/00*     (2006.01)
*F25B 25/00*     (2006.01)
(Continued)

(52) U.S. Cl.
CPC ........... *F25D 11/003* (2013.01); *F25B 9/006* (2013.01); *F25B 9/008* (2013.01); *F25B 25/005* (2013.01);
(Continued)

(58) Field of Classification Search
CPC ...... F25D 11/003; F25D 19/003; F25B 9/008; F25B 9/006; F25B 25/005; F25B 23/06;
(Continued)

(56) References Cited

U.S. PATENT DOCUMENTS 2,881,600 A     4/1959    Elfving
3,688,846 A     9/1972    Lease
(Continued)

FOREIGN PATENT DOCUMENTS

CN       204671777 U       9/2015
DE       102011108020 A1   4/2012
(Continued)

OTHER PUBLICATIONS

Singapore Search Report and Written Opinion dated Aug. 14, 2019 for Singapore Patent Application No. 11201803700X.
(Continued)

*Primary Examiner* — Justin M Jonaitis
(74) *Attorney, Agent, or Firm* — Bachman & LaPointe, P.C.

(57) ABSTRACT

A refrigerated transport system (20) comprises a body (22) enclosing a refrigerated compartment (69). A refrigeration system (30) comprises: a vapor compression loop (31) having a first heat exchanger (38) positioned to reject heat to an external environment in a cooling mode. A heat transfer (Continued)

loop (32) has a second heat exchanger (58) positioned to absorb heat from the refrigerated compartment in the cooling mode. An inter-loop heat exchanger (44) has a first leg (42) along the vapor compression loop and a second leg (43) along the heat transfer loop in heat exchange relation with the first leg.

20 Claims, 5 Drawing Sheets

(51) Int. Cl.
*F25B 9/00* (2006.01)
*F25D 19/00* (2006.01)
*F25B 23/00* (2006.01)
*B60H 1/32* (2006.01)
*B65D 88/74* (2006.01)

(52) U.S. Cl.
CPC .......... *F25D 19/003* (2013.01); *B60H 1/3232* (2013.01); *B65D 88/745* (2013.01); *F25B 23/006* (2013.01); *F25B 2309/06* (2013.01); *F25B 2400/05* (2013.01); *F25B 2400/12* (2013.01)

(58) Field of Classification Search
CPC .............. F25B 2309/06; F25B 2400/05; F25B 2400/12; B60H 19/003; B60H 1/3232; B65D 88/745
USPC .......................................................... 62/335
See application file for complete search history.

(56) References Cited

U.S. PATENT DOCUMENTS

| | | | |
|---|---|---|---|
| 3,886,535 A | 5/1975 | Cirincione | |
| 4,797,254 A | 1/1989 | Seidel | |
| 5,065,587 A | 11/1991 | Howland et al. | |
| 5,364,262 A | 11/1994 | Phillips | |
| 5,438,841 A | 8/1995 | Cahill-O'Brien et al. | |
| 5,457,963 A | 10/1995 | Cahill-O'Brien et al. | |
| 5,507,539 A | 4/1996 | Basinski | |
| 5,610,398 A | 3/1997 | Anderson et al. | |
| 5,918,475 A | 7/1999 | Sakakibara et al. | |
| 6,085,531 A | 7/2000 | Numoto et al. | |
| 7,145,788 B2 | 12/2006 | Plummer | |
| 7,150,159 B1* | 12/2006 | Brummett .......... | B60H 1/00378 62/236 |
| 7,673,466 B2 | 3/2010 | Pacy | |
| 8,051,882 B2 | 11/2011 | Koeninger et al. | |
| 8,820,102 B2 | 9/2014 | Shiraishi et al. | |
| 8,935,933 B1 | 1/2015 | Koelsch | |
| 9,033,116 B2 | 5/2015 | Breed | |
| 9,121,634 B2 | 9/2015 | Rogers et al. | |
| 2003/0136879 A1 | 7/2003 | Grabow et al. | |
| 2003/0213254 A1 | 11/2003 | Koo | |
| 2004/0055345 A1 | 3/2004 | Moore | |
| 2004/0084193 A1 | 5/2004 | Tseng | |
| 2005/0086952 A1 | 4/2005 | Nonaka et al. | |
| 2009/0216061 A1 | 4/2009 | Clark et al. | |
| 2009/0205846 A1 | 8/2009 | Zeweke et al. | |
| 2010/0147006 A1 | 6/2010 | Taras et al. | |
| 2011/0247350 A1 | 10/2011 | Awwad et al. | |
| 2012/0168184 A1 | 7/2012 | Enk, Sr. | |
| 2013/0213068 A1 | 8/2013 | Goel et al. | |
| 2014/0130528 A1 | 5/2014 | Morimoto et al. | |
| 2014/0260404 A1 | 9/2014 | Verma et al. | |
| 2014/0338374 A1 | 11/2014 | Cresswell et al. | |
| 2015/0257549 A1 | 9/2015 | Shaprio et al. | |
| 2015/0316521 A1 | 11/2015 | Goldman | |
| 2016/0101674 A1* | 4/2016 | Riviere ................... | B60P 3/205 62/89 |
| 2016/0272047 A1* | 9/2016 | Gan ...................... | B60H 1/3223 |

FOREIGN PATENT DOCUMENTS

| | | |
|---|---|---|
| DE | 102014205005 A1 | 9/2015 |
| EP | 0686744 A2 | 12/1995 |
| EP | 2284460 A1 | 2/2011 |
| GB | 1132151 A | 10/1968 |
| JP | 08266659 A | 10/1996 |
| JP | 10103838 A | 4/1998 |
| JP | 2000105034 A | 4/2000 |
| JP | 2001082816 A | 3/2001 |
| JP | 2004286363 A | 10/2004 |
| JP | 2005233577 A | 9/2005 |
| JP | 2006273413 A | 10/2006 |
| JP | 2007212113 A | 8/2007 |
| KR | 20020049553 A | 6/2002 |
| TW | 590926 B | 6/2004 |
| WO | 2008/033570 A2 | 3/2008 |
| WO | 2014152349 A1 | 9/2014 |
| WO | 2014179013 A1 | 11/2014 |
| WO | 2015009721 A1 | 1/2015 |
| WO | 2015032905 A1 | 3/2015 |
| WO | 2015/057298 A1 | 4/2015 |
| WO | 2015/057299 A1 | 4/2015 |
| WO | 2015057297 A1 | 4/2015 |
| WO | 2017/083336 A1 | 5/2017 |

OTHER PUBLICATIONS

Singapore Search Report and Written Opinion dated Sep. 6, 2019 for Singapore Patent Application No. 11201803405Q.
Container Parts Catalogue, Dec. 10, 2012, Gavan, Sydney, Australia.
Spec Sheet, Presenting the new NFI Intermodal RoadRail state-of-the-art refrigerated container, Dec. 27, 2010, NFI Intermodal, Cherry Hill, New Jersey.
Case Study, Ice Cream Manufacturer counts on NFI Intermodal RoadRail's New Refrigerated Containers to Deliver Product at -20F on Time, Dec. 27, 2010, NFI Intermodal, Cherry Hill, New Jersey.
International Search Report and Written Opinion dated Jan. 20, 2017 for PCT Patent Application No. PCT/US2016/061061.
International Search Report and Written Opinion dated Feb. 22, 2017 for PCT Patent Application No. PCT/US2016/061059.
U.S. Office Action dated Oct. 16, 2019 for U.S. Appl. No. 15/774,750.
International Search Report and Written Opinion dated Mar. 23, 2017 for PCT Patent Application No. PCT/US2016/061058.
Singapore Office Action dated Aug. 19, 2019 for Singapore Patent Application No. 11201803311V.
Chinese Office Action dated Nov. 26, 2019 for Chinese Patent Application No. 201680065410.1.

* cited by examiner

SERIES LOOP INTERMODAL CONTAINER

CROSS-REFERENCE TO RELATED APPLICATION

Benefit is claimed of U.S. patent application Ser. No. 62/253,081, filed Nov. 9, 2015, and entitled "Series Loop Intermodal Container", the disclosure of which is incorporated by reference herein in its entirety as if set forth at length.

BACKGROUND

The disclosure relates to refrigerated transport systems such as intermodal containers. More particularly, the disclosure relates to refrigerant safety in such refrigerated transport systems.

An exemplary refrigerated intermodal container (also known as a shipping container or intermodal shipping container) has an equipment module at one end of the container. The equipment module contains a vapor compression system having a compressor, a heat rejection heat exchanger downstream of the compressor along a refrigerant flow path, an expansion device, and a heat absorption heat exchanger. One or more first fans may drive an external air flow across the heat rejection heat exchanger. One or more second fans may drive an internal air flow across the heat absorption heat exchanger. In various implementations, for powering the container, there may be a power cord for connecting to an external power source. For ease of manufacture or service, the equipment module may be pre-formed as a module mateable to a remainder of the container body (e.g., insertable into an open front end of the body). One example of such a container refrigeration system is sold by Carrier Corporation of Farmington, Connecticut under the trademark ThinLINE. An example of such a system is seen in U.S. Patent Application 62/098,144, of Rau, filed Dec. 30, 2014 and entitled "Access Panel", the disclosure of which is incorporated in its entirety herein as if set forth at length. Additionally, refrigerated truck boxes, refrigerated railcars, and the like may have refrigeration systems with different forms or degrees of modularity.

There has been a general move to seek low global warming potential (GWP) refrigerants to replace conventional refrigerants such as R-134a. A number of proposed and possible future replacement refrigerants having low GWP also may have higher flammability and/or toxicity levels than prior refrigerants. These include various hydrofluorocarbon (HFC) and hydrocarbon (HC) refrigerants. Background flame arrestor technology for use with flammable refrigerants is found International Publication No. WO2015/009721A1, published Jan. 22, 2015, the disclosure of which is incorporated herein in its entirety by reference as if set forth at length.

Separately, series loop refrigeration systems have been proposed. An example of such a system is seen in US Patent Application Publication 2014/0260404 A1, of Verma et al., published Sep. 18, 2014, and entitled "High Efficiency Refrigeration System", the disclosure of which is incorporated in its entirety herein as if set forth at length. Further examples are seen in International Publication Number WO 2015/057299 A1, of Feng et al., published Apr. 23, 2015, and entitled "Two-Phase Refrigeration System" and International Publication Number WO 2015/057297 A1, of Feng et al., published Apr. 23, 2015, and entitled "Operation of a Cascade Air Conditioning System with Two-Phase Loop", the disclosures of which are incorporated in their entireties herein as if set forth at length.

SUMMARY

One aspect of the disclosure involves a refrigerated transport system comprising a body enclosing a refrigerated compartment. A refrigeration system comprises: a vapor compression loop having a first heat exchanger positioned to reject heat to an external environment in a cooling mode. A heat transfer loop has a second heat exchanger positioned to absorb heat from the refrigerated compartment in the cooling mode. An inter-loop heat exchanger has a first leg along the vapor compression loop and a second leg along the heat transfer loop in heat exchange relation with the first leg.

In one or more embodiments of any of the foregoing embodiments, the vapor compression loop sequentially comprises: a compressor; said first heat exchanger; an expansion device; and said first leg. The heat transfer loop sequentially comprises: a pump; said second heat exchanger; and said second leg.

In one or more embodiments of any of the foregoing embodiments, an electric fan is positioned to drive a recirculating air flow from the refrigerated compartment across the second heat exchanger.

In one or more embodiments of any of the foregoing embodiments, the first heat exchanger is a refrigerant-air heat exchanger.

In one or more embodiments of any of the foregoing embodiments, the inter-loop heat exchanger is a brazed plate heat exchanger.

In one or more embodiments of any of the foregoing embodiments, a carbon dioxide detector may be coupled to control a ventilation fan.

In one or more embodiments of any of the foregoing embodiments, a refrigerant charge of the vapor compression loop comprises at least 50% or at least 90% by weight propane.

In one or more embodiments of any of the foregoing embodiments, a heat transfer fluid of the heat transfer loop comprises at least 50% carbon dioxide, by weight.

In one or more embodiments of any of the foregoing embodiments, the system is an intermodal shipping container. The one or more doors are at a first end and the refrigeration system is mounted in an equipment module at a second end of the body opposite the first end.

In one or more embodiments of any of the foregoing embodiments: a wall of the equipment module divides the external environment from the refrigerated compartment; the inter loop heat exchanger is on the external environment side of the wall; and the second heat exchanger is on the refrigerated compartment side of the wall.

In one or more embodiments of any of the foregoing embodiments, the pump is on the refrigerated compartment side of the wall.

In one or more embodiments of any of the foregoing embodiments, one or more flame arrestors are across one or more openings of the equipment module.

In one or more embodiments of any of the foregoing embodiments, the one or more openings are along the front of the equipment module.

In one or more embodiments of any of the foregoing embodiments, the one or more flame arrestors comprise metallic wire mesh or perforated mesh.

The details of one or more embodiments are set forth in the accompanying drawings and the description below.

Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
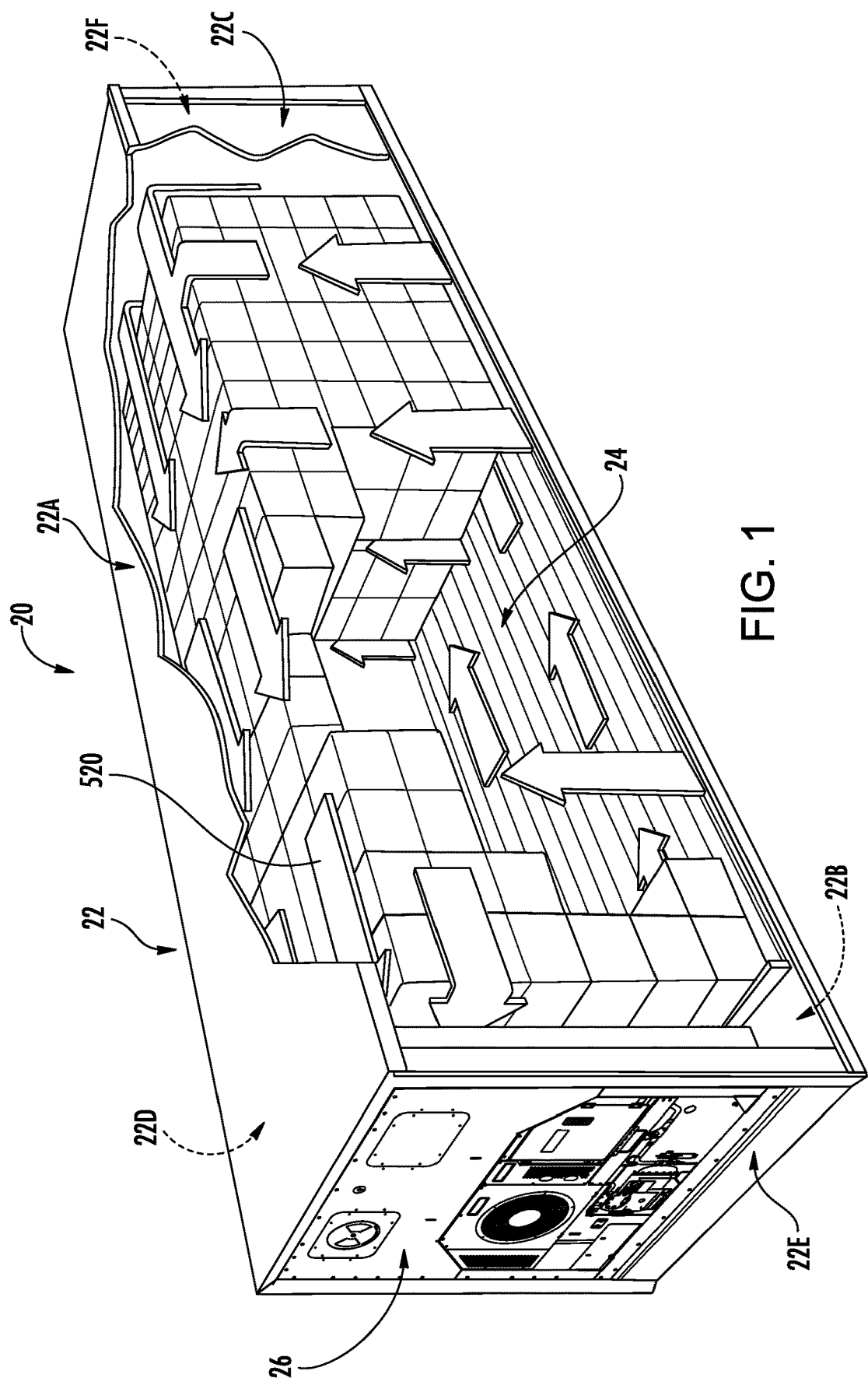
FIG. 1 is a cutaway view of a refrigerated cargo container.
Figure 2:
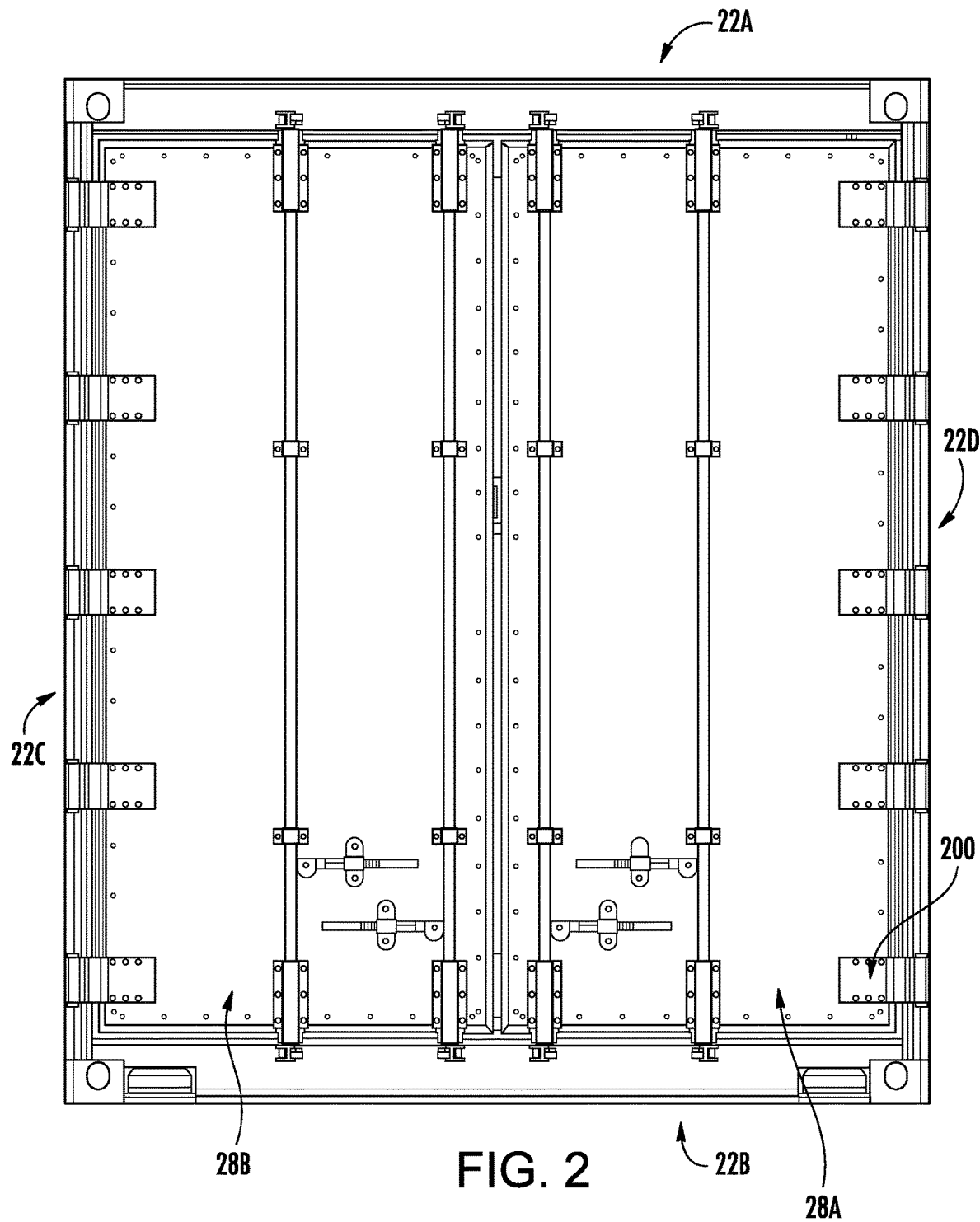
FIG. 2 is a rear view of the refrigerated cargo container.

FIG. 1 shows an intermodal container 20 that may be shipped, trucked, trained or the like. The container has a body 22 enclosing an interior 24. The body and interior are formed essentially as right parallelepipeds. The body has a top 22A, a bottom 22B, a first side 22C, a second side 22D, a first end 22E and a second end 22F. The top, bottom, and sides may be an integral rigid metallic structural system. The first end may be formed, in part, by an equipment module 26 ("equipment box"). The second end may essentially be formed by a pair of oppositely hinged doors 28A, 28B (FIG. 2).

The equipment module contains a refrigeration system 30 (FIG. 3) comprising a vapor compression loop 31 in tandem or series with a heat transfer loop 32. The heat transfer loop utilizes a relatively nonflammable and/or nontoxic working fluid compared with the refrigerant of the vapor compression loop. As is discussed below, the heat transfer loop may be a pumped loop (rather than a compression loop) and may have phase change. This avoids issues of flammable and/or toxic vapor accumulating in the refrigerated compartment and potentially causing explosion/fire, poisoning, or other safety issues. As is discussed below, various means may be taken to isolate the compartment interior from exposure to the refrigerant of the vapor compression loop. Additionally, various safety measures may be taken for the vapor compression loop (e.g., use of explosion proof components and other safety measures) but not necessarily at the same level as would be required for situations where the refrigerant could accidentally be introduced into the closed space of the refrigerated compartment.

Constructional and operational details of the refrigeration system may include some to all of those from the aforementioned US Patent Application Publication 2014/0260404 A1, International Publication Number WO 2015/057299 A1, and International Publication Number WO 2015/057297 A1.

The illustrated vapor compression loop comprises sequentially along a refrigerant flowpath 34, a compressor 36, a heat rejection heat exchanger 38, an expansion device 40 (e.g., electronic expansion valve, thermal expansion valve, orifice, or the like), and a leg 42 of an inter-loop heat exchanger 44.

One or more first fans 50 may drive an external air flow 520 across the heat rejection heat exchanger.

The heat transfer loop comprises, sequentially along a flowpath 54, a pump 56, a heat absorption heat exchanger 58 and a leg 43 of the inter-loop heat exchanger 44 in heat exchange relation with the leg 42. An optional receiver 59 is between the leg 43 and pump 56.

One or more second fans 60A, 60B (FIGS. 3 and 5) may drive an internal air flow 522A, 522B along respective flowpaths 510A, 510B across the heat absorption heat exchanger. In normal cooling operation, the pump may pump liquid refrigerant of the heat transfer loop to the heat absorption heat exchanger where the refrigerant receives heat from the air flows 522A, 522B. The heat absorption may cause a phase change to vapor. The refrigerant then passes to the leg 43 where it rejects heat to refrigerant in the leg 42. This will re-condense refrigerant to then pass as liquid back to the pump.

In various implementations, for powering the container, there may be a power cord (not shown) for connecting to an external power source. Additionally, the container may be associated with a generator 62 (FIG. 3, e.g., having an internal combustion engine). For intermodal containers, the generator may be a part of an accessory "genset" that may separately mount to a vehicle (trailer or rail car) carrying the container. Other transport refrigeration systems such as dedicated trailers may integrate the generator into an equipment body mounted to the front of the trailer box. The refrigeration system may include a main controller 64 (e.g., having a processor, memory and storage for running a program to perform the required functions) powered by a main battery 66. The battery is typically a rechargeable battery that charges when the container is plugged into external power or a running genset.

Figure 3:
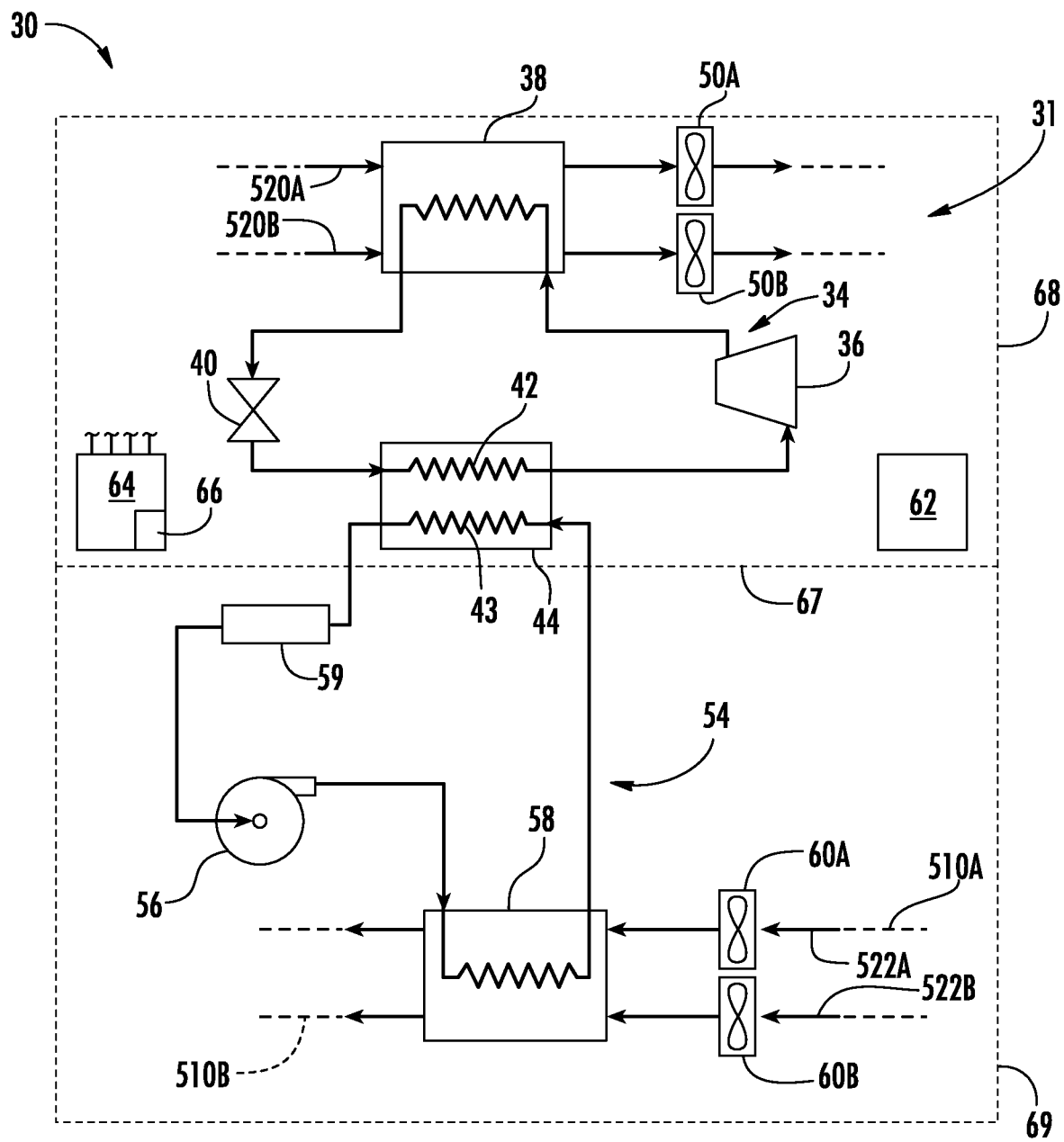
FIG. 3 is a schematic view of a refrigeration system of the refrigerated cargo container.

FIG. 3 generically shows a boundary 67 (formed by walls of the equipment module) between the exterior 68 which is open to the external environment and a climate controlled section 69 of the body interior. For safety, the vapor compression loop is kept completely on the exterior side of the boundary with the heat transfer loop line/conduit making two penetrations of that boundary.

For ease of manufacture or service, the equipment module (box) may be pre-formed as a module mateable to a remainder of the container body (e.g., insertable into an open front end of the body).

The module 26 comprises a front panel 70 (FIG. 2). The panel 70 may have a plurality of openings of which some may be closed by various means. Two of the openings 72A, 72B (FIGS. 3A and 5A) are along the respective air flowpaths 510A, 510B of the two evaporator fans. These flowpaths may be isolated from each other or may merely be adjacent halves of a single flowpath (or may be a combination, separating and merging). In this example, the opening spans the fan, so that a portion of the opening is upstream of the fan and a portion of the opening is downstream. The openings 72A, 72B are closed by respective access panels 80A, 80B (FIG. 2). The exemplary panel 80A includes a rotary gate valve for venting. It may also have a small blower fan 81A to withdraw air from the flowpath 510A (or may rely on leakage across the adjacent evaporator fan). Other valve/gate structures may be provided. Other valve/gate structures may be provided. The exemplary panel 80B lacks any vent/valve.

A beneficial combination of working fluid for the two loops is propane for the vapor compression loop and carbon dioxide for the heat transfer loop. Both are low cost and non-toxic and propane is a highly efficient refrigerant. Under ANSI/ASHRAE Standard 34-2007, R-290 (propane) is rated A3 (non-toxic, highly flammable) and R744 is rated as A1 (non-toxic, non-flammable).

In the two respective loops, the total refrigerant charge may consist essentially of said propane and said carbon dioxide, respectively, (e.g., allowing for industry standard levels of contaminants and additives such as corrosion inhibitors) or at least be 50% or at least 90% by weight said propane and said carbon dioxide.

Various mitigation measures may be taken regarding the two loops. As noted above, propane-carrying components are isolated from the refrigerated compartment and seals around and in the equipment module prevent propane leakage into the refrigerated compartment. Thus, additional safety measures relating to actions once propane has entered the refrigerated compartment may be avoided (e.g., as distinguished from situations where a propane-containing evaporator is exposed to the refrigerated compartment). Mitigation measures may then be limited to external propane leakage and internal carbon dioxide leakage if at all.

Exemplary propane leakage mitigation is passive and is discussed below.

Figure 5:
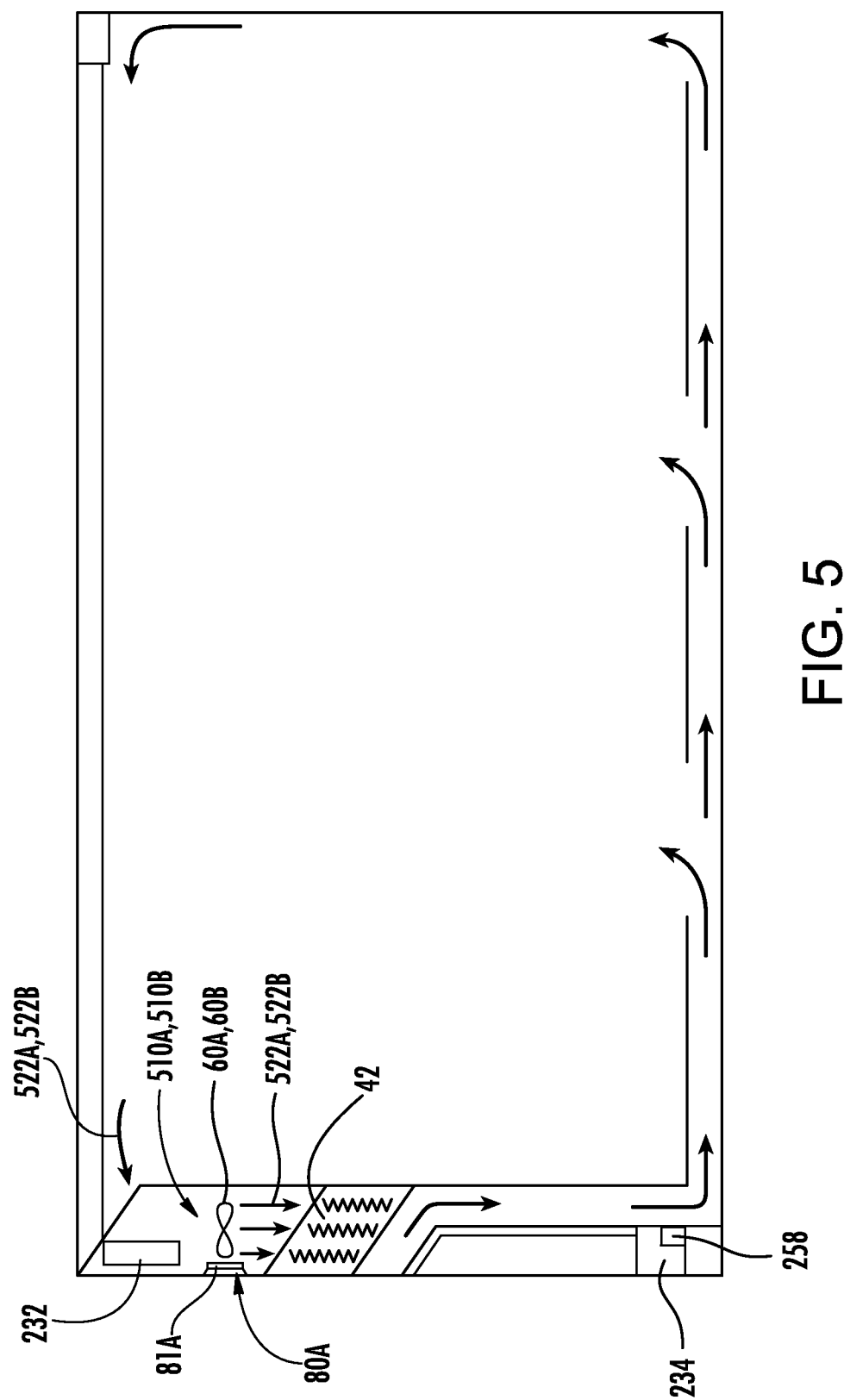
FIG. 5 is a schematic side cutaway view of the refrigerated cargo container.

Exemplary carbon dioxide mitigation is active responsive to detecting of a refrigerant leak by a detector 232 (FIG. 5). Carbon dioxide detectors are used to maximize produce freshness by controlling carbon dioxide build up in refrigerated containers generally (e.g., including those using refrigerants other than carbon dioxide). That same detector or an added detector may be used to mitigate leaks of carbon dioxide into the refrigerated compartment. A number of possible locations exist for such a detector including locations within the equipment box (e.g., adjacent the evaporator in a duct along one of the flowpaths 510A or 510B either inside or outside the equipment module communicating with the rest of the refrigerated compartment or space) or more remote (e.g., even as far away as on or adjacent the doors). Exemplary detectors comprise infrared sensors along with signal processing and output electronics as may be appropriate. Exemplary infrared sensors are non-dispersive infrared (NDIR) sensors. Exemplary NDIR sensors have target sensing ranges associated with carbon dioxide.

Although there may be various hardwired/hardcoded or analog implementations with little control logic, an exemplary implementation involves the detector 232 communicating with a programmed controller which in turn communicates with the active mitigation components. The controller may be the main controller 64 of the refrigeration system or may be a separate unit 234 (FIG. 5, e.g., having a processor, memory and storage for running a program to perform the required functions and, optionally, its own battery 258 (e.g., an alkaline battery)).

For carbon dioxide mitigation, the detector and controller may be coupled to a ventilation system for venting the interior of the container in response to leak detection. Some implementations may use baseline fresh air exchange vents (e.g., 80A shown above and, its associated blower fan, if any, and/or evaporator fan) to do the venting. For example, implementation might involve the opening of the gate valve 80A and the running of the fan 81A and/or 60A. This may be done regardless of whether the refrigeration system is running. For example, carbon dioxide leaks may occur even when the system is off but. In some implementations, the detection may cause a shutting down of the refrigeration system (e.g., the compressor and pump).

As an alternative to the use of the gate valve 80A or other means associated with a baseline system, venting may be done by a dedicated additional venting fan (e.g., along with controllable shutter or other valving). In such a situation, the fan unit could include its own battery and electronics optionally integrated with one of the other components such as the controller 234 and/or the detector 232.

Propane mitigation may include use of components to prevent or block sparking or arcing, including use of known forms of explosion-proof motors. Relevant motors for scrutiny include: the compressor motor; fan motors (particularly for the heat rejection heat exchanger); and actuator motors. This may include replacing or modifying baseline motors and adding motors associated with features such as supplemental vents, supplemental fans, and the like.

Arcing would be undesirable in motor commutation. Induction motors would be good choices. Such a motor may have a totally enclosed frame and be sealed from any vapor penetration, this would include seals to shafts that would drive the fan. All connections to such motors may be sealed from any vapor penetration. This sealing would include the conduit via which wire enters the motor connection box Totally hermetic heaters would be used along the recirculating flowpaths (used for evaporator defrost and heating when external temperatures are so low that the compartment must be heated rather than cooled). Thus, any failure mode would not result in an electrical arc.

Some-to-all electrical interconnections (wire, cable) potentially exposed to propane leaks may be sealed in exposition proof conduit. Penetrations between the exterior side and the evaporator side of the equipment module would be explosion proof (no vapor penetration). Some-to-all sensors along the exterior side may be sealed from vapor penetration so that any failure mode would not result in an electrical arc in a location of possible refrigerant exposure.

As noted above, such propane mitigation may be avoided for electrical components and connections on the evaporator side such as: the evaporator fan motors; evaporator side heaters; and the DTS (defrost termination sensor) on the evaporator coil, HTT (high temperature termination sensor) on the evaporator coil, and temperature measurement sensor located slightly downstream of the evaporator.

Figure 4:
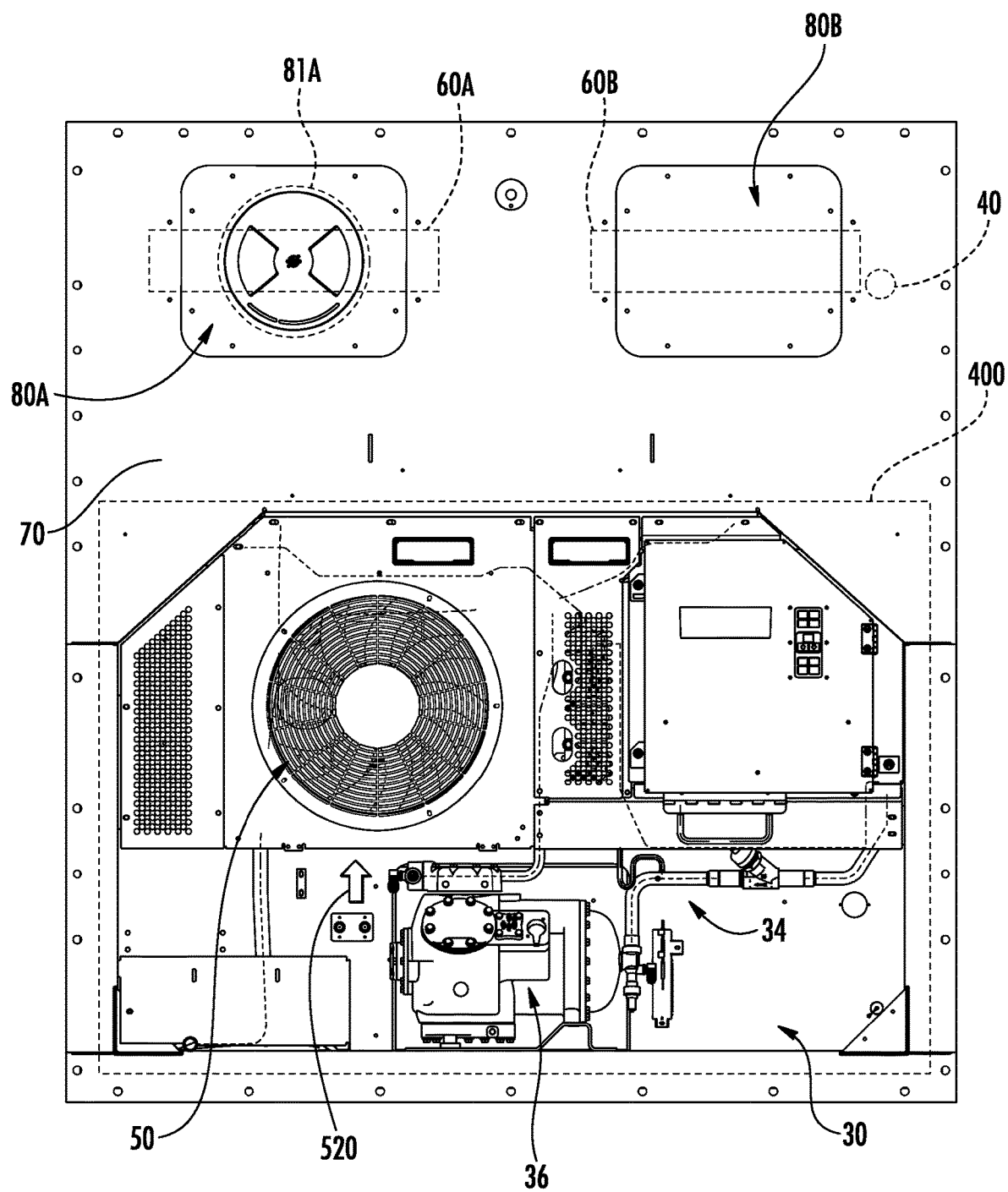
FIG. 4 is a front view of a refrigeration unit of the container of FIG. 1.

Additional propane mitigation involves the placement of flame arrestors in a number of exterior locations. Background flame arrestor technology which may be utilized is found International Publication No. WO2015/009721A1, published Jan. 22, 2015, the disclosure of which is incorporated herein in its entirety by reference as if set forth at length. One exemplary flame arrestor is one or more woven wire or perforated mesh (e.g., expanded metal mesh) panels 400 (FIG. 4) across openings along the front of the equipment box. This may cover openings to the compressor, heat exchangers, and any piping or other refrigerant carrying components of the vapor compression loop 31. Mesh opening size will depend on the inherent flammability and expected operating conditions of the particular refrigerant. However, locations along the flowpaths 510A and 510B may be avoided.

The system may be made using otherwise conventional or yet-developed materials and techniques.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic refrigeration system and/or container construction and associated use methods, details of such existing configuration or its associated use may influence details of particular implementations. Accordingly, other embodiments are within the scope of the following claims.

What is claimed is:

1. A refrigerated transport system (20) comprising:
a body (22) enclosing a refrigerated compartment (69) and comprising:
a pair of side walls (22C, 22D);
a top (22A);
a bottom (22B); and
one or more doors (28A, 28B); and
a refrigeration system (30) comprising:
a vapor compression loop (31) having a first heat exchanger (38) positioned to reject heat to an external environment in a cooling mode;
a heat transfer loop (32) having a second heat exchanger (58) positioned to absorb heat from the refrigerated compartment in the cooling mode, wherein a heat transfer fluid of the heat transfer loop comprises at least 50% carbon dioxide, by weight; and
an inter-loop heat exchanger (44) having a first leg (42) along the vapor compression loop and a second leg (43) along the heat transfer loop in heat exchange relation with the first leg.

2. The refrigerated transport system of claim 1, wherein:
the vapor compression loop sequentially comprises:
a compressor (36);
said first heat exchanger;
an expansion device (40); and
said first leg; and
the heat transfer loop sequentially comprises:
a pump (56);
said second heat exchanger; and
said second leg.

3. The refrigerated transport system of claim 2, further comprising:
an electric fan (60A, 60B) positioned to drive a recirculating air flow from the refrigerated compartment across the second heat exchanger.

4. The refrigerated transport system of claim 2, wherein:
the first heat exchanger is a refrigerant-air heat exchanger.

5. The refrigerated transport system claim 1, wherein:
the inter-loop heat exchanger is a brazed plate heat exchanger.

6. The refrigerated transport system of claim 1, further comprising:
a carbon dioxide detector.

7. The refrigerated transport system of claim 6 further comprising:
a ventilation fan (81A, 60A).

8. The refrigerated transport system of claim 1, wherein:
a refrigerant charge of the vapor compression loop comprises at least 50% by weight propane.

9. The refrigerated transport system of claim 1, wherein:
a refrigerant charge of the vapor compression loop comprises at least 90% by weight propane.

10. The refrigerated transport system of claim 1, being an intermodal shipping container, wherein:
the one or more doors are at a first end (28A, 28B); and
the refrigeration system is mounted in an equipment module (26) at a second end of the body opposite the first end.

11. The refrigerated transport system of claim 10, wherein:
a wall (67) of the equipment module divides the external environment from the refrigerated compartment;
the inter-loop heat exchanger is on the external environment side of the wall; and
the second heat exchanger is on the refrigerated compartment side of the wall.

12. The refrigerated transport system of claim 11, wherein:
the vapor compression loop sequentially comprises:
a compressor (36);
said first heat exchanger;
an expansion device (40); and
said first leg;
the heat transfer loop sequentially comprises:
a pump (56);
said second heat exchanger; and
said second leg; and
the pump is on the refrigerated compartment side of the wall.

13. The refrigerated transport system of claim 10, further comprising:
at least one flame arrestor across at least one opening of the equipment module.

14. The refrigerated transport system of claim 13, wherein:
said at least one opening is along the front of the equipment module.

15. The refrigerated transport system of claim 13, wherein:
the at least one flame arrestor comprises metallic wire mesh or perforated mesh.

16. A refrigerated transport system (20) comprising:
a body (22) enclosing a refrigerated compartment (69) and comprising:
a pair of side walls (22C, 22D);
a top (22A);
a bottom (22B); and
one or more doors (28A, 28B); and
a refrigeration system (30) comprising:
a vapor compression loop (31) having a first heat exchanger (38) positioned to reject heat to an external environment in a cooling mode wherein a refrigerant charge of the vapor compression loop comprises at least 50% by weight propane;
a heat transfer loop (32) having a second heat exchanger (58) positioned to absorb heat from the refrigerated compartment in the cooling mode; and
an inter-loop heat exchanger (44) having a first leg (42) along the vapor compression loop and a second leg (43) along the heat transfer loop in heat exchange relation with the first leg.

17. The refrigerated transport system of claim 16, wherein:
a refrigerant charge of the vapor compression loop comprises at least 90% by weight propane.

18. An intermodal shipping container (20) comprising:
a body (22) enclosing a refrigerated compartment (69) and comprising:
a pair of side walls (22C, 22D);
a top (22A);
a bottom (22B); and
one or more doors (28A, 28B) at a first end of the body;
an equipment module (26) at a second end of the body opposite the first end with at least one flame arrestor across at least one opening of the equipment module; and
a refrigeration system (30) mounted in the equipment module and comprising:

a vapor compression loop (31) having a first heat exchanger (38) positioned to reject heat to an external environment in a cooling mode;

a heat transfer loop (32) having a second heat exchanger (58) positioned to absorb heat from the refrigerated compartment in the cooling mode; and an inter-loop heat exchanger (44) having a first leg (42) along the vapor compression loop and a second leg (43) along the heat transfer loop in heat exchange relation with the first leg.

19. The intermodal shipping container of claim 18, wherein:

said at least one opening is along the front of the equipment module.

20. The intermodal shipping container of claim 18, wherein:

the at least one flame arrestor comprises metallic wire mesh or perforated mesh.

* * * * *